United States Patent [19]
Berninger

[11] 3,794,787
[45] Feb. 26, 1974

[54] SUPPORT ASSEMBLY FOR A THROTTLE PEDAL AND SWITCH ACTUATABLE THEREBY

[75] Inventor: Gale F. Berninger, Rochester, N.Y.

[73] Assignee: General Motors Corporation, Detroit, Mich.

[22] Filed: Dec. 11, 1972

[21] Appl. No.: 313,786

[52] U.S. Cl............ 200/61.89, 200/86.5, 200/153 C
[51] Int. Cl. ............................................. H01h 3/14
[58] Field of Search . 200/61.39, 61.4, 61.41, 61.89, 200/86.5, 153 C

[56] References Cited
UNITED STATES PATENTS
2,716,678    8/1955    Randol............................. 200/61.89
3,313,897    4/1967    Gorsky............................. 200/61.89
3,487,183    12/1969   Schulman........................ 200/61.89

Primary Examiner—James R. Scott
Attorney, Agent, or Firm—Arthur N. Krein

[57] ABSTRACT

A pedal lever and switch support assembly adapted to be mounted on the firewall of a vehicle wherein the pivot section of the pedal lever is pivotably and slidably supported by a support bracket that carries a switch actuatable by the pivot section when slidably moved in the support bracket.

3 Claims, 4 Drawing Figures

PATENTED FEB 26 1974 3,794,787

SUPPORT ASSEMBLY FOR A THROTTLE PEDAL AND SWITCH ACTUATABLE THEREBY

This invention relates to a crank lever device and, more particularly, to a support assembly having a throttle pedal lever and a switch actuatable by the throttle pedal lever.

It may be desirable to pivotally and slidably support a crank arm so that its pivotable movement in the support controls one device while at the same time its slidable movement in the support controls a second device. For example, it may be desirable to mount a vehicle throttle pedal lever on a vehicle firewall by a support permitting the operator of the vehicle to control the throttle valve of the vehicle engine by pivoting the pedal lever in its support while at the same time permitting the vehicle operator to actuate a second device, such as, for example, to effect the opening and closing of an electrical switch carried by the support.

It is an object of the present invention to provide a support assembly pivotably and slidably supporting a crank arm and supporting a control device actuatable by the crank arm when slidably moved in the support.

It is a further object of the invention to provide a support assembly to support the throttle pedal of a vehicle so that the throttle pedal can be actuated to both control the throttle valve of the vehicle engine and to make or break an electrical circuit.

It is a further object of the present invention to provide a support assembly including a support for pivotably and slidably supporting the pivot section of a crank arm to actuate a switch supported by the support in the path of sliding movement of the pivot section of the crank arm, the support being of a unitary construction wherein the structure for pivotably and slidably supporting the pivot section is integral with the structure for supporting the switch and effects alignment of the pivot section of the crank arm and the switch.

It is a further object of the invention to provide a unitary assembly supporting a vehicle throttle pedal lever and a switch actuatable thereby, the assembly being adapted to be mounted on the firewall of the vehicle with one end of the throttle pedal lever adapted to be operatively connected to the vehicle throttle linkage and with the switch connected in circuit with an electrical device to be controlled thereby.

These and other objects of the present invention are provided by a pedal lever and a switch support assembly including a support bracket supporting both the pivot section of a pedal lever and a switch, the support bracket being adapted to be mounted on the firewall of a vehicle so that the pedal lever may be operatively connected with the vehicle throttle linkage and the switch may be connected with an electrical device. The pivot section is slidably and pivotably supported in an elongated slot provided in each of two spaced-apart bearing members of the support bracket and the switch is carried by the support bracket between the bearing members. One end of each slot is terminated by a curved wall against which the pivot section bears as it pivots while effecting movement of the movable contact of the switch when an actuating force is applied to the pedal lever. When the actuating force is removed, foam pads carried by the support bracket of the assembly slide the pivot section out of contact with the movable contact of the switch and against a bearing plate terminating the other end of each slot.

These and other objects and advantages of the present invention may be better understood with reference to the following description taken in conjunction with the attached drawings, wherein.

Figure 1:
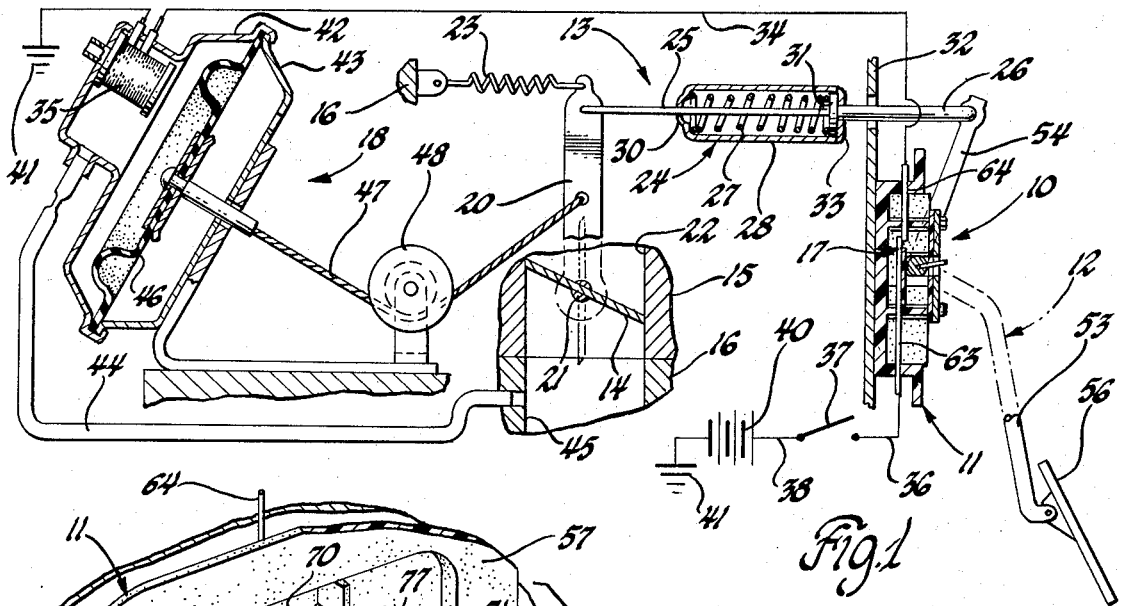
FIG. 1 is a schematic view of a vehicle throttle control having a pedal lever and switch support assembly provided in accordance with the present invention.

A pedal lever and switch support assembly of the present invention is generally designated 10 in FIG. 1, which illustrates a suitable environment for this assembly as being in a throttle pedal actuated throttle return system of a type disclosed in copending United States patent application Ser. No. 274,577, filed July 24, 1972, in the name of Donald D. Stoltman, and assigned to the same assignee as that of the subject application.

As shown in FIG. 1, a pedal lever and switch support assembly 10 includes a support bracket 11 that pivotably and slidably supports a pedal lever 12 connected, in a manner to be described, as a part of a throttle linkage assembly 13 for actuation by a vehicle operator to normally control movement of the throttle valve 14 of a conventional carburetor 15 mounted on a conventional internal combustion engine 16 of a vehicle, not shown. Support bracket 11 also has mounted therein an electrical pedal actuated switch 17 actuated by pedal lever 12, in a manner to be described, to control the operation of a throttle return device, generally designated 18.

Throttle linkage assembly 13 comprises a throttle lever 20 for pivoting the throttle shaft 21 carrying the throttle valve 14 in the throttle bore 22 of carburetor 15, throttle lever 20 being biased by a return spring 23 to normally return throttle valve 14 to the idle position and being actuated in a throttle opening direction by a spring loaded variable length device 24 connected to one end of throttle lever 20. The spring loaded variable length device 24 comprises the throttle rod 25 and the accelerator rod 26, one end of throttle rod 25 being pivotably connected to throttle lever 20 and one end of accelerator rod 26 being pivotably connected to one end of pedal lever 12 and the other end of throttle rod 25 being spring coupled by spring 27 to the other end of accelerator rod 26 in a cylinder 28. Throttle rod 25 passes through an aperture in one end wall 30 of cylinder 28 and terminates in a spring stop 31, and accelerator rod 26 passes through the firewall 32 of the vehicle and is suitably connected to the end wall 33 of cylinder 28. Coupling spring 27 encircles throttle rod 25 in cylinder 28 and abuts at one of its ends against end wall 30 and at its other end against spring stop 31 so that throttle rod 25 is normally biased to move conjointly with accelerator rod 26.

However, should movement of cylinder 28 in the throttle valve closing direction be inadvertently restrained, throttle rod 25 is caused to move in the throttle closing direction relative to accelerator rod 26 as the throttle return device 18 applies a sufficient force to the throttle lever 20 to compress coupling spring against the end wall 30. The force effected by the throttle return device 18 on throttle lever 20, as well as the spring rate of coupling spring 27 and the effective length of travel of spring stop 31 are selected in a manner known to those skilled in the art to effect a return of throttle valve 14 to its idle position from any open position. However, to normally permit throttle lever 20 to be accurately positioned in response to the application and removal of actuating force to and from pedal lever 12, the normal bias of coupling spring 27 is selected to be greater than the normal return bias of return spring 23 so that whenever pedal lever 12 is actuated in the throttle opening direction, return spring 23 yields instead of coupling spring 27.

One contact arm of the pedal actuated switch 17 is connected by a conductor 34 to one terminal of a first electrical device in the form of the solenoid controlled valve 35 of the throttle return device 18, and the other contact arm of pedal actuated switch is connected by a conductor 36, the ignition switch 37, and a conductor 38 to one terminal of the vehicle battery 40, the other terminal of the solenoid controlled valve 35 and the battery 40 being connected to ground 41.

The solenoid controlled valve 35 is operatively connected to the differential fluid pressure operated power actuator in the form of vacuum motor 43 of the throttle return device 18 to selectively open and close a passage through the housing part 42 thereby selectively placing the vacuum chamber of the vacuum motor 43 in communication with the atmosphere, the vacuum chamber being suitably connected by the conduit 44 to communicate with the induction passage 45 of the induction manifold of engine 16. The diaphragm 46 of vacuum motor 43 is suitably connected to the throttle lever 20 in a manner normally not impeding the normal operation of throttle lever 20, such connection in the embodiment shown being by a cable 47 positioned by the engine mounted pulley 48 to force throttle lever 20 in the closing direction when, on release of actuating force from pedal lever 12, solenoid controlled valve 35 is energized to close the vent passage therethrough to effect vacuum actuation motor 43. Subsequent application of actuating force to pedal lever 12 de-energizes the solenoid controlled valve 35 to open the vent passage therethrough, thereby balancing the pressures on the opposite sides of the vacuum motor diaphragm and thereby permitting pedal lever 12 to effect normal opening control of the throttle lever 20 against the bias of return spring 23. For further details of the construction and operation of the throttle return system, reference is made to the above-identified copending United States patent application Ser. No. 274,577.

Figure 2:
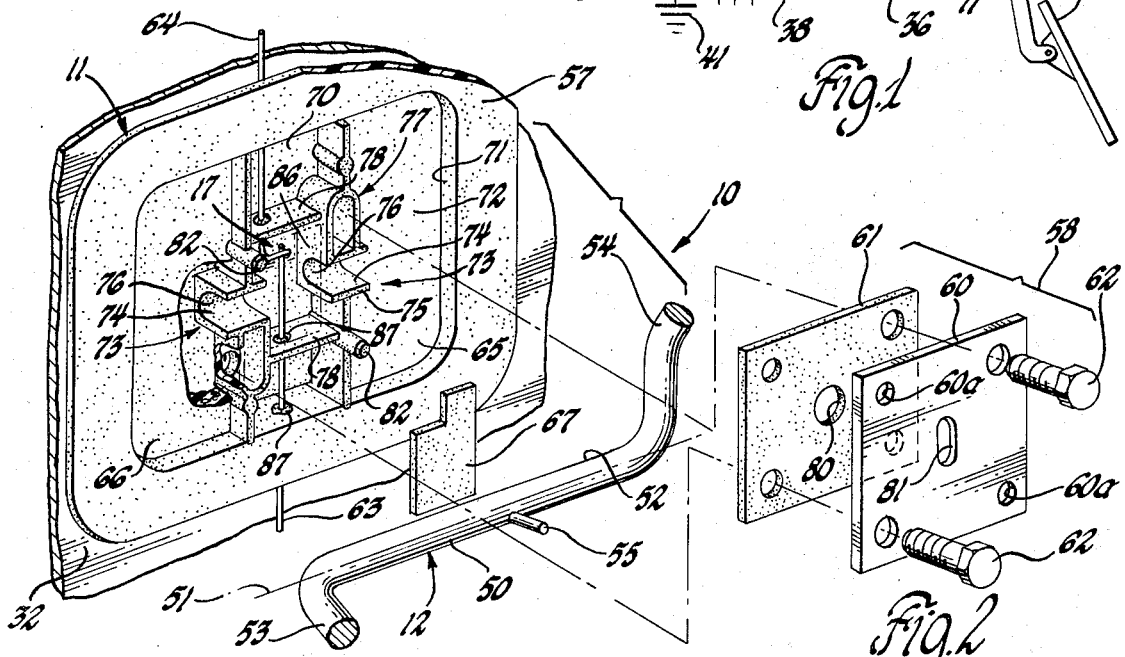
FIG. 2 is an enlarged, exploded, perspective view of the pedal lever and switch support assembly of FIG. 1.
Figures 3, 4:
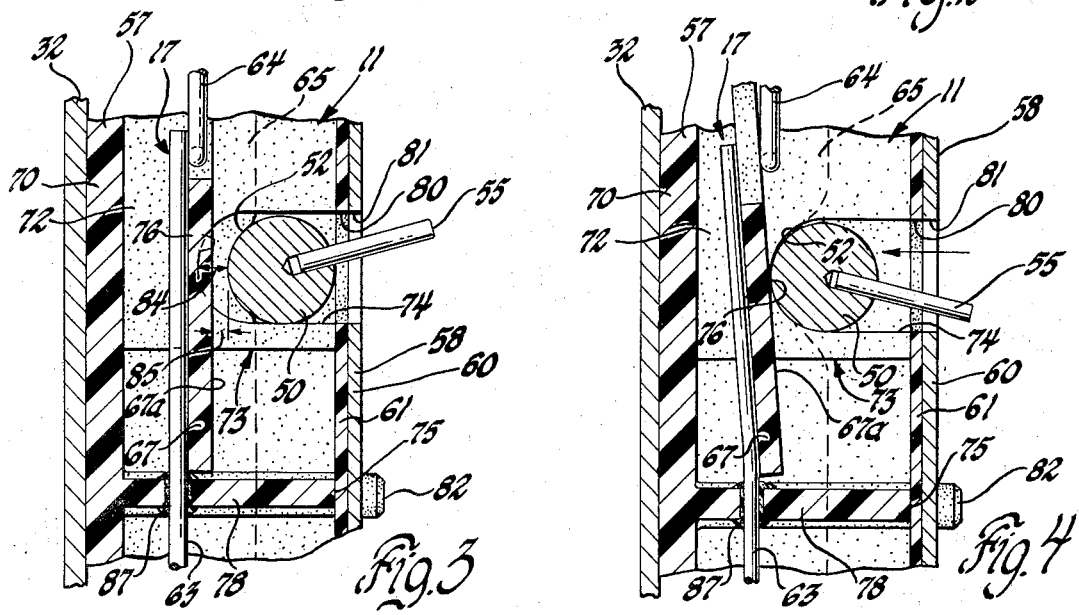
FIG. 3 is an enlarged view of a portion of the pedal and switch support assembly of FIG. 1 showing the arrangement of the elements when no actuating force is applied to the vehicle throttle pedal.
FIG. 4 is a view similar to that of FIG. 3 showing the arrangement of the elements when actuating force is applied to the vehicle throttle pedal.

Looking now in greater detail to the subject matter of the present invention and using descriptive terms with reference to FIGS. 2, 3 and 4 and not in any limiting sense, pedal lever 12, as best seen in FIG. 2, is conventional and includes a cylindrical rod-like metallic pivot section 50 pivotable about a pivot axis 51 therethrough. Pivot section 50 is integral at its opposite ends, respectively, with a lower crank arm 53 and an upper crank arm 54, and a positioning pin 55 is suitably affixed to pivot section 50 intermediate its ends for positioning pedal lever 12 in bracket 11 in a manner to be described. Lower crank arm 53 and upper crank arm 54 extend at right angles from pivot section 50 and, as best seen in FIG. 1, the lower crank arm 53 pivotably supports the vehicle throttle pedal 56 at its lower end and the upper crank arm 54 is pivotably connected to the accelerator rod 26 of the throttle linkage assembly 13.

For ease of assembly the support bracket 11 is made in two held together parts, a box-like base part 57 and a cover part 58. Cover part 58 comprises a cover plate 60 backed by a cover sheet 61 for retaining and positioning the pivot section 50 of pedal lever 12 in the base part 57 and is joined thereto by screws 62 which, in the present embodiment, are adapted to also mount the support bracket 11 to the firewall 32 of the vehicle. Also supported by the support bracket 11 in a manner to be described are the metallic movable contact arm 63 and the metallic fixed contact arm 64 of the pedal actuated switch 17, a pair of spaced apart foam pads 65 and 66 for normally biasing the pivot section 50 out of contact with the movable contact arm 63, of spring material, when actuating force is removed from the throttle pedal 56, and an acutator pad 67 of electrical insulating material for separating the pivot section 50 from the movable contact arm 63.

Base part 57 of support bracket 11 comprises a rectangularly shaped base wall 70 one face of which is adapted to be securely seated on the rearwardly facing side of the vehicle firewall 32 so that the open end of the box-like structure faces the passenger compartment of the vehicle. Integral with the base wall 70 and extending peripherally from the edges thereof at right angles thereto is a sidewall 71 which, with base wall 70, forms a cavity 72 the width of which is sufficient between two sides of sidewall 71 to receive the axial length of pivot section 50 without binding against the lower crank arm 53 or the upper crank arm 54 thereof.

Positioned in cavity 72 to extend at right angles from base wall 70 thereof parallel to the sidewall 71 are a pair of spaced apart support members 73 each having an open ended U-shaped slot 74. One end of each support member 73 is affixed to base wall 70 as by being integral therewith and the other end terminates in a generally flat support surface 75 for supporting and positioning the cover part 58 of bracket 11. One end of each U-shaped slot 74 is open to receive the pivot section 50 and the other end of each U-shaped slot 74 terminates in a curved surface 76 for pivotally supporting pivot section 50 parallel to base wall 70 when pivot section 50 is actuated to slidingly bear on the curved surfaces 76 when an actuating force is applied to the throttle pedal 56. A webbed structure 77 having a pair of spaced apart cross walls 78 extends from the base wall 70 to reinforce the support members 73, webbed structure 77 being integral at one end with base wall 70 and terminating at the other end in the support surface 75.

To positively position pivot section 50 in the cavity 72 so as to prohibit binding of the side walls 71 against either the lower crank arm 53 or the upper crank arm 54 of the pedal lever 12, the radial extending positioning pin 55 fixed to pivot section 50 extends through a suitable aperture 80 in cover sheet 61 and through an elongated guide slot 81 in cover plate 60. Cover plate 60, having guide slot 81 therein, is centrally located between the side walls 71 by a pair of spaced apart guide pins 82 extending from support surface 75 at right angles to base wall 70 through the apertures 60a in cover plate 60, the length of elongated slot 81 permitting unrestricted movement of positioning pin 55 in a plane perpendicular to the plane of base wall 70 as pivot section 50 pivots while the sides of slot 81 limit the axial movement of pivot section 50.

As best seen in FIGS. 3 and 4, the width of each slot 74 is sufficiently greater than the diameter of pivot section 50 so that pivot section 50 may slide freely in slots 74 and, the length of each slot 74 is greater than the diameter of pivot section 50 by a maximum slide length 84 sufficient to permit pivot section 50 to slide a free slide length 85 before actuating the pedal actuated switch 17, the maximum slide length 84 being measured in a direction perpendicular to base wall 70 between those portions of curved surface 76 and cylindrical surface 52 nearest base wall 70 when pivot section 50 is biased by foam pads 65 and 66 to bear against cover sheet 61 and the free slide length 85 being measured in the same direction between cylindrical surface 52 and the surface 67a of acutating pad 67 when pivot section 50 is biased against cover sheet 61 with the actuating pad contacting movable contact arm 63 when it is in electrical contact with arm 64.

Thus, pivot section 50 is free to slide in slots 74 in the path of a plane at right angle to the base wall 70 and intersecting the pivot axis 51 of pivot section 50 when movement of pivot section 50 is effected between a first position determined by the portion of curved surfaces 76 nearest base wall 70 and a second position determined by cover sheet 61 of cover part 58 of bracket 11. Moreover, as will be described shortly, actuation of pedal switch 17 is effected by the pivot section 50, through engagement with the actuating pad positioned therebetween, as it travels the portion of maximum slide length 84 remaining after the free slide length 85 has been taken up.

The respective straight and L-shaped free ends of the movable contact arm 63 and the stationary contact arm 64 of the pedal actuated switch 17 are mounted in base part 57 so as to normally contact each other in a generally rectangular pocket 86 formed between the support members 73 and otherwise bounded by the base wall 70 and cross walls 78 thereof. The fixed ends of the movable and stationary contact arms 63 and 64 respectively extend out of the base part 57 to permit ready electrical connection of the pedal actuated switch 17 in the desired electrical circuit, and intermediate their free and fixed ends, each contact arm 63 and 64 passes through and is affixed such as by cement 87 to both the sidewall 71 and the cross wall 78 of the base part 57. Pad 67 is provided with a cutout portion at one corner thereof to permit movement thereof for actuation of contact arm 63 without engaging contact arm 64. The straight free end of movable contact arm 63 is movable between a position in electrical contact with arm 64, as shown in FIG. 3, to a position out of electrical contact with contact arm 64 when actuated by the pivot section 50 through the actuating pad 67, to the position shown in FIG. 4.

Operation

The resistance to clockwise rotation of pedal lever 12 effected by the throttle linkage assembly 13 when actuating force is first applied to throttle pedal 56, in effect causes the pedal lever to pivot clockwise about its pivotal connection to accelerator rod 26 and therefore permitting sliding movement of the pivot section 50 in the U-shaped slot 74 until this section contacts the curved surfaces 76 of the supporting members 73. Thus, when the actuating force on throttle pedal 56 is sufficient to overcome the bias of form pads 65 and 66, pivot section 50, as best seen in FIG. 4, is moved towards base wall 70 in the path of the plane to first traverse the free slide length 85 of the maximum slide length 84 until contact is made between the cylindrical surface 52 of pivot section 50 and the surface 67a of the actuating pad 67 and then to take up the remaining portion of the maximum slide length 84 until pivot section 50 contacts the curved surfaces 76 of the support members 73. In taking up this remaining portion of the maximum slide length 84, pivot section 50 forces the actuating pad 67 towards the base wall 70 to move the movable contact arm 63 out of electrical contact with the fixed contact arm 64. With the cylindrical surface 52 of the pivot section 50 held in contact with the curved surfaces 76 of support members 73 by the actuating force applied to the throttle pedal 56, the curved surfaces 76 provide a fulcrum on which the pivot section 50 slidingly pivots in the clockwise direction about pivot axis 51 thereof to open the throttle valve 14 through the throttle linkage assembly 13.

When the actuating force is removed from the vehicle throttle pedal 56, foam pads 65 and 66 effect movement of pivot section 50 away from base wall 70, and movable contact arm 63 is again free to engage contact arm 64. The free slide length 85 thus assures that the pivot section 50 when in its non-actuated position does not affect any actuating force on the movable contact arm 63, and thereby obviates the necessity for adjusting each pedal switch 17 for any manufacturing tolerances that might be present.

When movable contact arm 63 recontacts the stationary contact arm 64, the pedal actuated switch 17 closes the electrical circuit between the two electrical devices connected respectively to its movable and fixed contact arm 63 and 64, such circuit in the embodiment in which pedal actuator switch 17 is illustrated, energizing the throttle return device 18 to effect closing movement of the throttle valve 14 in the manner described in greater detail in the hereinabove cited United States patent application, such application being hereby expressly incorporated herein by reference.

Having described one embodiment of the present invention, it is understood that the specific terms and examples are employed in a descriptive sense only and not for the purpose of limitation. Other embodiments of the invention, modifications thereof, and alternatives thereto may be used. I, therefore, aim in the appended claims to cover such modifications and changes as are within the true spirit of my invention.

What I claim as new and desire to secure by Letters Patent by the United States is:

1. A crank lever device comprising, in combination:

a. pedal lever means including a rod-like pivot section having a crank arm extending from each end thereof b. a pedal lever and switch support bracket including a pair of pivot section support members adapted to receive said pivot section, said pivot section being retained therein rotatably about its axis and slidable perpendicular to its axis between a first limiting position and a second limiting position;

c. biasing means carried by said bracket in contact with said pivot section, said biasing means biasing said pivot section toward said second limiting position; and d. electrical switch means comprising first and second contact arms carried on said bracket, said first contact arms being biased toward said second contact arm and allowed to make electrical contact with said second contact arm when said pivot section is in its second limiting position, said first contact arm being movable out of electrical contact with said second contact arm by said pivot section upon the movement of said pivot section to its first limiting position.

2. A crank lever device in a vehicle mounted engine throttle control system including a throttle pedal and a throttle linkage actuated throttle valve, said crank lever device comprising, in combination:

a. a pedal lever and switch support bracket including a first bracket part which comprises a base wall mounted on a support surface of said vehicle, side wall means extending from the far side of said base wall from said support surface and a spaced-apart pair of pivot section support members also extending from said far side of said base wall inside said side wall means, each of said pivot section support members having a U-shaped slot therein extending from the free end thereof toward said base wall and ending in a closed surface, said pedal lever and switch support bracket also including a second bracket part fastened to said side wall means and held against said free ends of said pivot section support members to form the other ends of said slots;

b. pedal lever means comprising a rod-like pivot section with one crank arm extending at a right angle from one end thereof to connect with said throttle pedal and another crank arm extending at a right angle from the other end thereof to connect with said throttle linkage, said pivot section being pivotally supported in said slots of said pivot support members and slidable therein between a first limiting position adjacent the curved surfaces and a second limiting position adjacent the second bracket part;

c. biasing means carried by said first bracket part between said base wall and said pivot section, said biasing means being effective to bias said pivot section toward said second limiting position; and d. electrical switch means comprising first and second contact arms carried on said bracket, said first contact arm being biased into electrical contact with said second contact arm when said pivot section is in its second limiting position, said first contact arm being adapted to be moved out of electrical contact with said second contact arm by said pivot section upon the movement of said pivot section to its first limiting position.

3. A crank lever device comprising, in combination:

a. pedal lever means including a rod-like pivot section having a crank arm extending from each end thereof;

b. a pedal lever and switch support bracket including a pair of pivot section support members adapted to receive said pivot section, said pivot section being retained therein rotatably about its axis and slidable perpendicular to its axis between a first limiting position and a second limiting position;

c. biasing means carried by said bracket in contact with said pivot section, said biasing means biasing said pivot section toward said second limiting position; and d. electrical switch means comprising first and second contact arms carried on said bracket, said first contact arm being biased by its own resiliency toward said second contact arm and allowed to make electrical contact with said second contact arm when said pivot section is in its second limiting position, said first contact arm being movable out of electrical contact with said second contact arm by said pivot section upon the movement of said pivot section to its first limiting position.

* * * * *